Oct. 18, 1932. H. J. UPTON 1,883,160
FRICTIONAL PACKING
Filed Sept. 6, 1929
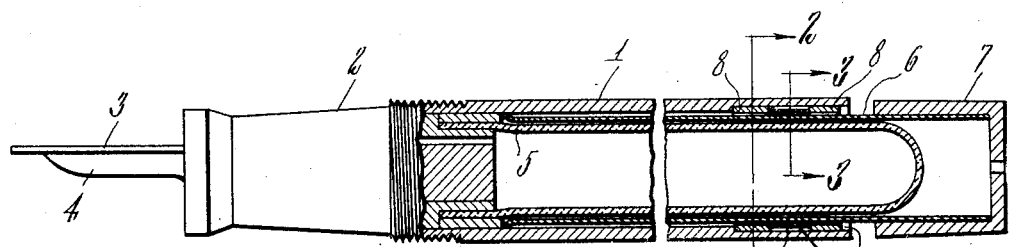
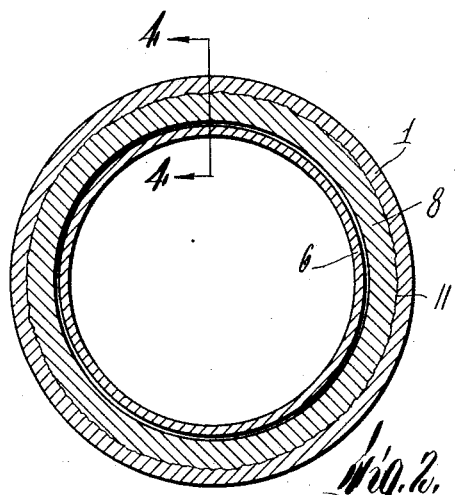
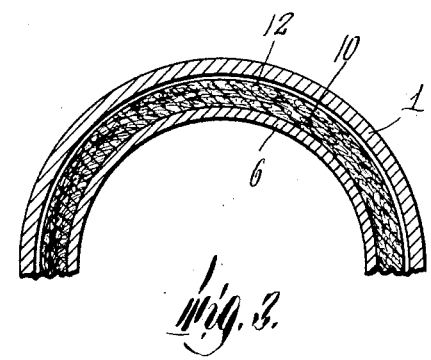
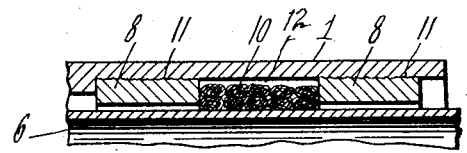
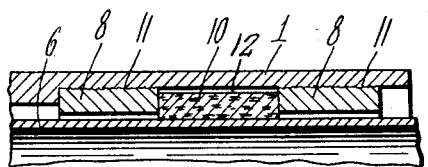
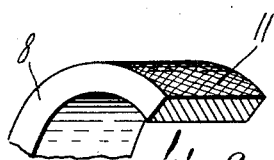
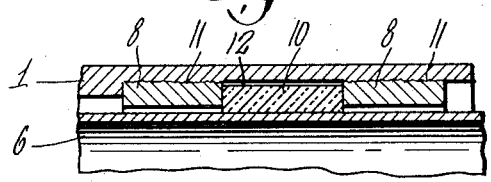
Inventor:
Henry J. Upton,
by Wright Brown Quinby & May
Attys.

Patented Oct. 18, 1932

1,883,160

UNITED STATES PATENT OFFICE

HENRY J. UPTON, OF MEDFORD, MASSACHUSETTS, ASSIGNOR, BY MESNE ASSIGNMENTS, TO THE CHILTON PEN COMPANY, INC., OF LONG ISLAND CITY, NEW YORK, A CORPORATION OF NEW YORK

FRICTIONAL PACKING

Application filed September 6, 1929. Serial No. 390,754.

This invention relates to frictional packing for producing a fluid tight joint between relatively movable members, more especially where one of these members is made of material liable to variation in size from time to time, or is subject to other distortion. One example of material of this nature is pyroxlin plastic, which is commonly used, for example, for the barrel portions of fountain pens or the like, and is sold under various trade names. This material as made contains camphor and after it has been cut to form, the camphor at and adjacent to the freshly cut surface evaporates during a "curing" period, this evaporation causing shrinkage of the article. Even after a sufficient "cure" has been produced, there is a further evaporation of the camphor with resultant shrinkage for an indefinitely long period. If, therefore, a tubular member such as a pen barrel be made of such material and it is desired to maintain a fluid tight joint between it and a member slidable therethrough, if the pen barrel were originally made of a size satisfactory to form a fluid tight joint with the inner member it would soon be too tight to permit movement of the other member therethrough. An example of a construction wherein such sliding movement between a barrel portion and another member is found in a certain fountain pen construction in connection with which the subject matter of the present invention was developed, but it should be understood that except as may otherwise be herein stated, it is in no way limited thereto.

The joint of my invention, therefore, consists of a pair of spaced sizing elements carried by the one of the relatively slidable members which is subject to distortion, the sizing elements being made of material not substantially subject to such distortion. These elements hold between them a frictional packing which engages the other slidable member with a fluid tight joint. This other member is freely slidable with reference to the spaced elements, which are so carried by the one member that its distortion occurs in a direction preferably to increase the tenacity with which the elements are held thereto.

For a more complete understanding of this invention, reference may be had to the accompanying drawing in which Figure 1 is a side elevation partly broken away of a fountain pen embodying a joint constructed in accordance with this invention.

Figures 2 and 3 are sections to a much larger scale on lines 2—2 and 3—3, respectively, of Figure 1.

Figure 4 is a detail section similar to a portion of Figure 1, but to a much larger scale.

Figures 5 and 6 are views similar to Figure 4, but showing modifications.

Figure 7 is a fragmentary perspective of one of the spacing elements.

Referring first to Figure 1, at 1 is indicated an outer barrel member of a fountain pen made of pyroxlin plastic or similar material subject to shrinkage. This barrel member is shown as having fixed thereto at one end a pen section 2 carrying a pen point 3 and having an ink feeder 4 positioned to feed ink to the pen point, this feeder extending into the pen barrel and opening into a flexible walled ink reservoir 5.

Within the pen barrel 1 and outwardly of the ink reservoir 5 is a tubular member 6 slidable within the barrel in telescopic relation thereto. The outer end of this tubular member 6 is closed as by the cap 7 which may be formed of material presenting substantially the same finish as the exterior of the barrel member 1. This member 6 may be formed of metal, and is not subject to substantial size variation or distortion and in order that a fluid tight but sliding fit may be insured between this member 6 and the outer member 1, the packing joint of this invention is employed. This joint comprises a pair of sizing ring members 8 spaced apart and shown as seated in a suitable counterbored portion 9 in the rear end of the barrel member 1. These ring members are made of material such as metal not subject to substantial shrinkage or distortion in use and serve to maintain an open passage for the slidable reception of the tube 6.

Between these ring elements 8 is positioned a suitable packing 10 which makes a fluid tight joint with the outer wall of the inner tubular member 6 and with the adjacent faces of the sizing rings 8. As shown in Figure 7 the outer face of each of the sizing rings may be roughened as at 11, whereby the shrinkage of the barrel member 1 thereon acts to grip these ring members more and more tightly and prevent their detachment therefrom. The outer face of the packing 10 is somewhat smaller in diameter than that of the sizing rings 8 in order to leave a space 12 between the packing and the member 1, so that shrinkage of the member 1 between the sizing rings may not impose a cramping pressure against the packing material such as would prevent sufficiently easy sliding movement of the tubular member 6 therethrough.

The packing may be made in various forms, certain of which are illustrated in various figures of the drawing. For example in Figures 1, 3 and 4 it is shown in preferred form as made of fibrous strand material such as a thread of suitable size wound around the inner member 6 and substantially filling the space between the sizing rings 8 and the inner face of the member 1 therebetween though as before stated its outer diameter is less than that of the rings 8. Preferably this packing is treated with a suitable lubricating agent which will aid in the sliding movement of the two tubular members but which will not deposit visible oil or grease on the outer face of the inner member 6. Such material, for example, may be a lubricating wax. Instead of forming the packing material of thread or the like, it may, with less advantage, be formed from cork, either ground and packed into position or cut from a single or a plurality of pieces. Such material also is preferably saturated with a suitable lubricating agent. This construction is illustrated in Figure 5.

Another form of packing is shown in Figure 6 in which the packing material comprises a rubber composition. The inner diameter of the rings 8 should be sufficiently large so that the inner tubular member 6 may slide freely therethrough under all conditions to which the article is to be subjected in service.

In assembling the parts of the pen illustrated and described herein as one embodiment of the invention, preferably, the lower end of the inner barrel 6 is flared outwardly to prevent its accidental removal. The bushing or sizing rings 8 are placed on the tube 6 prior to the flaring of the end thereof, or placed on over the opposite end prior to the application of the cap 7. Thereafter, the packing 10 is placed on the tube 6 by wrapping the thread and waxing it. The tube 6, after the cap 7 is placed thereon, is inserted into the outer barrel 1, and the sizing rings 8 forced into position to hold the packing 10. The fit does not have to be very tight because the subsequent shrinkage of the barrel 1 occasions a very tight fit. It will be noted that a substantial space is left between the outer surface of the packing 10 and the inner surface of the outer barrel 1. The purpose of this is to permit the outer barrel 1 to shrink, without tightening the packing to a point where the inner barrel will not slide freely.

It will be seen that the present invention provides a very efficient and effective packing, particularly applicable to fountain pens made from a shrinkable material, such as pyroxylin plastic. By having the inner barrel of metal, there is no change in size therein and the packing may be wrapped about this barrel, leaving sufficient space for the outer shrinking barrel to close in on it. In this manner, a liquid-tight seal is formed immediately that the parts are assembled and, at the same time, sufficient space is left between the packing and the outer barrel to permit shrinkage of the outer barrel, without affecting the operation of the joint.

As various changes may be made in the form, construction and arrangement of parts without departing from the spirit and scope of the invention and without sacrificing its advantages, it is to be understood that all matter herein is to be interpreted as illustrative and not in a limiting sense.

I claim:

1. A joint between a pair of relatively slidable members, one of which is subject to size variations due to shrinkage, which comprises a pair of spaced sizing elements of material not subject substantially to such size variations carried by said one member in position to maintain a free sliding fit with the other of said members, and a packing positioned between said elements and spaced from said one member and making a fluid tight joint with said other member and said elements.

2. In a device of the class described, the combination of inner and outer tubular members slidable with respect to each other, one of said tubular members being subject to size variations due to shrinkage, a pair of ring members secured in position on one of said slidable members to permit free sliding of the other of said members, and packing material between said ring members spaced from one of said relatively movable members and making a substantially fluid-tight joint with the other of said relatively movable members, thereby preventing wedging of parts due to size variations in the member subject thereto.

3. In a device of the class described, the combination of an outer barrel of a pyroxylin plastic subject to size variations due to shrinkage, a collapsible sac secured within said outer barrel, a metallic tube extending about said collapsible sac within said outer barrel and slidable with respect to said outer barrel, a pair of ring members secured in said outer barrel, and a packing intermediate said ring members contacting with and forming a substantially fluid-tight joint with said inner slidable barrel, the tightness of said joint being substantially independent of the variations in the size of the outer barrel, due to shrinkage.

4. In a fountain pen of the class described, the combination of an outer barrel made of a material subject to size variations due to shrinkage, an ink sac secured within said outer barrel, a tubular member substantially free from size variations telescoped about said ink sac within said outer barrel, a pair of sizing rings secured to said outer barrel, and a packing material forming a fluid-tight joint with said inner tubular member and extending between said pair of sizing rings, the outer periphery of said packing material being spaced from the inner surface of the barrel whereby size variations in the barrel of the pen will not affect materially the fluid-tight joint made by the packing material on said tubular member.

5. In a fountain pen of the class described, the combination of an outer tubular barrel made of material subject to size variations due to shrinkage, an inner metallic tubular member slidable with respect to the outer barrel, a pair of sizing rings mounted within and secured to said outer barrel, and a packing between said sizing members formed by wrapping a lubricated thread about said inner tubular member to provide a substantially fluid-tight joint between said inner tubular member and said outer tubular barrel.

6. In a device of the class described, the combination of an outer barrel member made of a material subject to size variations due to shrinkage, an inner tubular member formed of metal, a collapsible sack within the inner tubular member, a sizing element secured in said outer barrel member, a packing adjacent said sizing member comprising a lubricated thread wrapped about said inner tubular member to form a fluid-tight joint therewith, the outer periphery of said packing being spaced from the inner surface of said barrel member to prevent size variations of the barrel member from affecting the operation of the joint.

7. In a fountain pen of the class described, the combination of an outer barrel member made of pyroxylin plastic or the like, which is subject to size variations due to shrinkage, an inner slidable metal member, a sizing ring in said outer barrel member, the outer surface of said sizing ring being roughened to be held within said outer member by the contraction of the outer tubular member, and a packing adjacent said sizing ring forming a fluid-tight joint with said inner tubular member.

In testimony whereof I have affixed my signature.

HENRY J. UPTON.